United States Patent [19]

Fujioka et al.

[11] Patent Number: 4,803,571
[45] Date of Patent: Feb. 7, 1989

[54] FLOPPY DISC MAGNETIC HEAD APPARATUS COMPATIBLE WITH BOTH HORIZONTAL AND PERPENDICULAR RECORDING MEDIA

[75] Inventors: Toshiyuki Fujioka, Nishitama; Masahiro Kusunoki, Tachikawa; Koji Osafune, Nishitama, all of Japan

[73] Assignee: Kabushiki Kaisha Toshiba, Kawasaki, Japan

[21] Appl. No.: 32,442

[22] Filed: Mar. 31, 1987

[30] Foreign Application Priority Data

Mar. 31, 1986 [JP] Japan .................................. 61-70731

[51] Int. Cl.$^4$ ............................................... G11B 5/48
[52] U.S. Cl. ...................................... 360/63; 360/119; 360/121
[58] Field of Search ................... 360/63, 27, 119, 121, 360/122, 61, 62, 66, 118

[56] References Cited

U.S. PATENT DOCUMENTS

| | | | |
|---|---|---|---|
| 3,812,529 | 5/1974 | Yoichi | 360/66 |
| 3,882,544 | 5/1975 | Hughes | |
| 4,079,426 | 3/1978 | Umeda et al. | 360/61 |
| 4,441,132 | 4/1984 | Morita et al. | |
| 4,466,026 | 8/1984 | Miura et al. | 360/61 |
| 4,644,432 | 2/1987 | Heim | 360/62 |

FOREIGN PATENT DOCUMENTS

| | | | |
|---|---|---|---|
| 61-39911 | 2/1986 | Japan . | |
| 2441654 | 3/1976 | Netherlands | 360/66 |

*Primary Examiner*—Aristotelis M. Psitos
*Assistant Examiner*—Kevin John Fournier
*Attorney, Agent, or Firm*—Cushman, Darby & Cushman

[57] ABSTRACT

In a horizontal recording medium, new information can be overwritten upon old information at a low recording density without erasing the medium. In a perpendicular recording medium, on the other hand, new information is recorded at a high recording density after having erased the medium. On the basis of the above features of the horizontal and perpendicular recording mediums with different recording densities, the apparatus comprises first magnetic head with a long gap for the horizontal recording medium, a second magnetic head with a short gap for the perpendicular recording medium, and a heat selector, in order to provide a magnetic recording and reproducing apparatus compatible with both high and low recording density mediums.

6 Claims, 5 Drawing Sheets

FLOPPY DISC MAGNETIC HEAD APPARATUS COMPATIBLE WITH BOTH HORIZONTAL AND PERPENDICULAR RECORDING MEDIA

BACKGROUND OF THE INVENTION

1. Field of the Invention

The present invention relates generally to a magnetic recording and reproducing apparatus for recording information in a magnetic recording medium and for reproducing the recorded information from the magnetic recording medium.

2. Description of the Prior Art

In a floppy disk device (referred to as FDD hereinafter) used s an external storage device for an electronic computer, information is recorded in a flexible magnetic disc (referred to as a disk hereinafter) or reproduced therefrom through a magnetic recording and reproducing head (referred to as a R/W head) on the basis of electric-to-magnetic transduction (referred to as electromagnetic transduction hereinafter). In this FDD field, conventionally, a horizontal (in-plane) magnetic recording technique has been adopted such that information is recorded when the magnetic material is magnetized in the horizontal direction or along the surface of the disk. Recently, however, a perpendicular magnetic recording technique in which information is recorded when the magnetic material is magnetized in the vertical direction of the surface of the has been developed. In this perpendicular magnetic recording method, since two adjacent magnetization directions are opposite to each other and therefore strong residual magnetization can be maintained, it is possible to improve the recording density (referred to as BPI (bit per inch) hereinafter) up to about several times that of the horizontal recording medium. For example, the recording density is about 9K BPI in the horizontal recording medium, and about 40K BPI in the perpendicular recording medium.

Since apparatuses of the perpendicular magnetic recording type have been developed, the storage capacity of the disk has been increased markedly. However, it is desirable that a disk in which information is recorded in accordance with the horizontal magnetic recording method also be usable in common, for the magnetic recording and reproducing apparatus of the perpendicular magnetic recording type, from the standpoint of availability of recorded information. However, since the BPI greatly differs between the horizontal and perpendicular recording mediums that is, since there exists a big difference in electromagnetic transduction performance or characteristics between the two, it is impossible to stably record information in the two disks or to reproduce the recorded information therefrom. Therefore, these exists a problem in that it is impossible to use in common a floppy disk in which information is recorded so as to correspond to an apparatus of the horizontal magnetic recording of the perpendicular magnetic recording type

SUMMARY OF THE INVENTION

With these problems in mind, therefore, it is the primary object of the present invention to provide a magnetic recording and reproducing apparatus applicable to both the floppy disk devices of the horizontal and perpendicular recording medium with a BPI for each medium different from the other medium, respectively.

To achieve the above-mentioned object, the magnetic recording and reproducing apparatus according to the present invention comprises (a) first magnetic head means for recording and reproducing information in or from a horizontal recording medium at a first predetermined recording density; (b) second magnetic head means arranged backward from the first magnetic head means in a magnetic recording medium travel direction, for recording and reproducing information in or from a perpendicular recording medium at a second predetermined recording density higher than that of the horizontal recording medium; and (c) head selecting means for selecting any one of the first and second magnetic head means in response to a signal indicative of the presence of any one of the horizontal and perpendicular recording medium with the first and second predetermined recording densities, respectively.

In the horizontal magnetic recording medium, a gap length of the magnetic head is relatively long, so that the recording density (BPI) is low. However, since a one bit area at which one bit information is recorded by the magnetic head is broad, it is possible to overwrite new information data upon old information data already recorded in the horizontal medium without erasing the old information data from the medium.

In contrast with, this, in the perpendicular magnetic recording medium, a gap length of the magnetic head is relatively short, so that the recording density (BPI) is high. However, since the recording area is limited, it is impossible to overwrite new information data upon old information data already recorded in the perpendicular recording medium. Therefore, the old information data should be erased before the writing of new data. This is because in the case of the perpendicular recording method, the electromagnetic transduction performance is relatively low.

In the magnetic recording and reproducing apparatus according to the present invention, when a horizontal recording medium floppy disk is loaded in the apparatus, the head selecting means selects the first magnetic head so that information data are recorded (overwritten) or reproduced on or from the disk through the first magnetic head without erasing the disk, in response to a signal indicative of the presence of the horizontal recording medium.

In contrast with this, when a perpendicular recording medium floppy disk is loaded in the apparatus, the head selecting means selects the first magnetic head as an erasing head and the second magnetic head as a recording and reproducing head after having erased the disk by the first magnetic head, in response to a signal indicative of the presence of the perpendicular recording medium.

Further, in the case of the horizontal recording medium, it is preferable to additionally provide a third erasing magnetic head for erasing both the end portions of the medium on which information is recorded, because information is recorded relatively unstably at both the ends thereof. Furthermore, it is also possible to use the apparatus according to the present invention so that two horizontal or perpendicular mediums having two different recording densities, respectively, are available.

BRIEF DESCRIPTION OF THE DRAWINGS

The features and advantages of the magnetic recording and reproducing apparatus according to the present invention will be more clearly appreciated from the following description of the preferred embodiments of the present invention taken in conjunction with the accompanying drawings in which like reference numerals designate the same or similar elements or sections throughout the figures thereof and in which.

DETAILED DESCRIPTION OF THE PREFERRED EMBODIMENTS

The embodiments of the present invention will be described hereinbelow with reference to FIGS. 1 to 7, in which the magnetic heads and the selector circuit are shown so as to be applicable to a floppy disk device.

Figure 1:
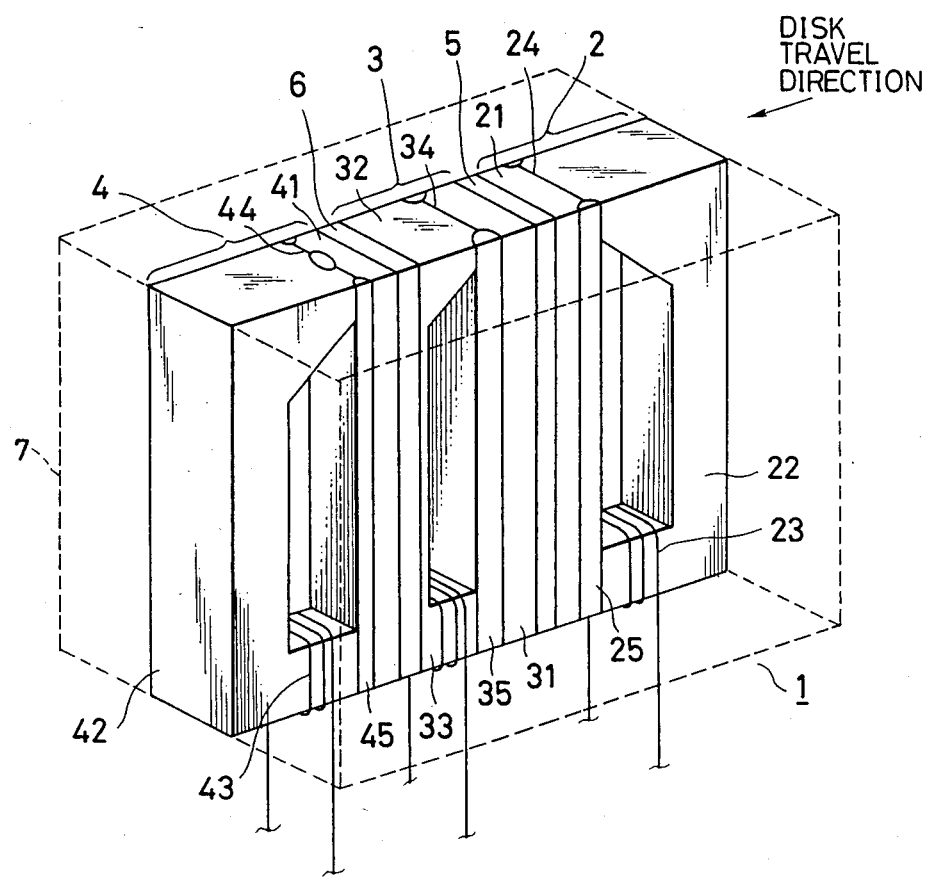
FIG. 1 is a perspective view showing a transducer and its periphery for a magnetic head assembly of a first embodiment of the present invention.

FIG. 1 shows a transducer unit for the FDD. The transducer 1 is made up of a first magnetic head 2, a second magnetic head 3, an erasing head 4, a first separator 5 for magnetically separating the first magnetic head 2 from the second magnetic head 3 or vice-versa, a second separator 6 for magnetically separating the second magnetic head 3 from the erasing head 4 or vice-versa, and a core holder 7 as shown by dashed lines in the drawing. The above elements 2, 3, 4 and 5, 6 are all arranged in order in the direction that a floppy disk travels.

The first magnetic head 2 is composed of two cores 21 and 22 and a coil 23 wound around the core 22. On the surface of the magnetic head 2 where the head 2 is in slidable contact with a disk (not shown), a gap 24 is formed between the two cores 21 and 22. This gap 24 is filled with a non-magnetic material 25 such as glass.

The second magnetic core 3 is composed of two cores 31 and 32 and a coil 33 wound around the core 32. On the surface of the magnetic head 3 where the head 3 is in slidable contact with a disk (not shown), a gap 34 is formed between the two cores 31 and 32. This gap 34 is filled with a non-magnetic material 35.

Similarly, the erasing head 4 is composed of two cores 41 and 42 and a coil 43 wound around the core 42. On the surface of the erasing head 4 where the head 4 is in slidable contact with a disk (not shown), a gap 44 is filled with a non-magnetic material 45.

Figure 2:
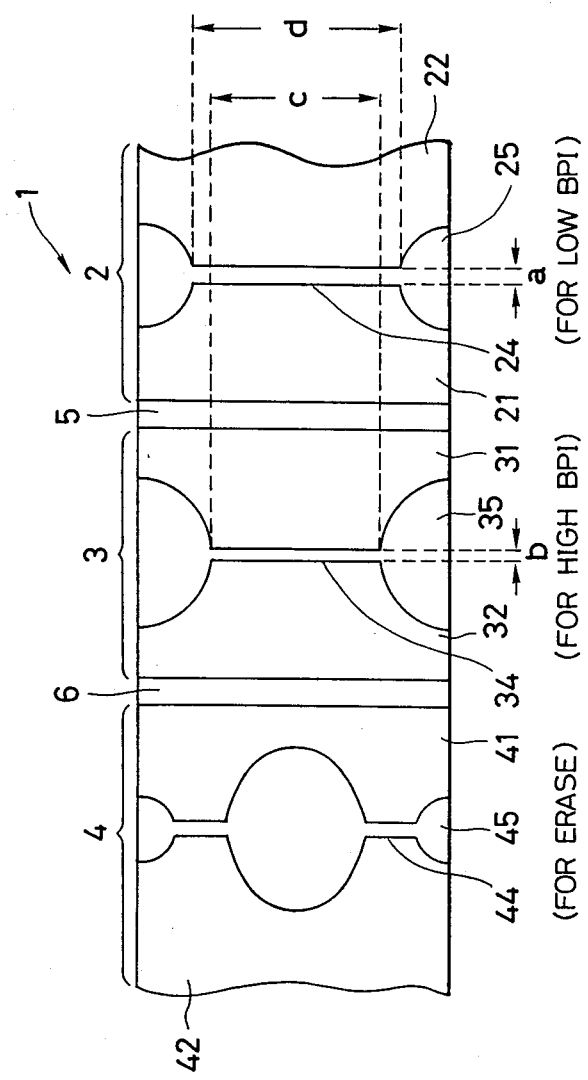
FIG. 2 is an enlarged top view showing a sliding contact surface portion (relative to the disk) of the transducer shown in FIG. 1.

FIG. 2 is an enlarged top view showing the disk sliding contact surface of the transducer 1.

The length a of the gap 24 of the magnetic head 2 is formed to be longer than length b of the gap 34 of the magnetic head 3. Further, the width d of the gap 24 is formed wider than width c of the gap 34. The gap 44 of the erasing head 4 is formed at such a position as to erase both the end portions at which information has been recorded in a disk by the first magnetic head 2. The reason why these end portions are erased is to provide a spatial allowance which allows a mutual positional dispersion or scattering between the transducer and the disk tracks. In addition, information recorded at both the ends of the horizontal recording disk is relatively unstable, as compared with that recorded in the perpendicular recording disk.

The longer gap length a of the gap 24 of the first magnetic head 2 is so determined as to be suitable for recording and reproducing information at a relatively low recording density (low BPI) of the horizontal magnetic recording type, while the shorter gap length b of the gap 34 of the second magnetic head 3 is so determined as to be suitable for recording and reproducing information at a relatively high recording density (high BPI) of the perpendicular magnetic recording type.

Figure 3:
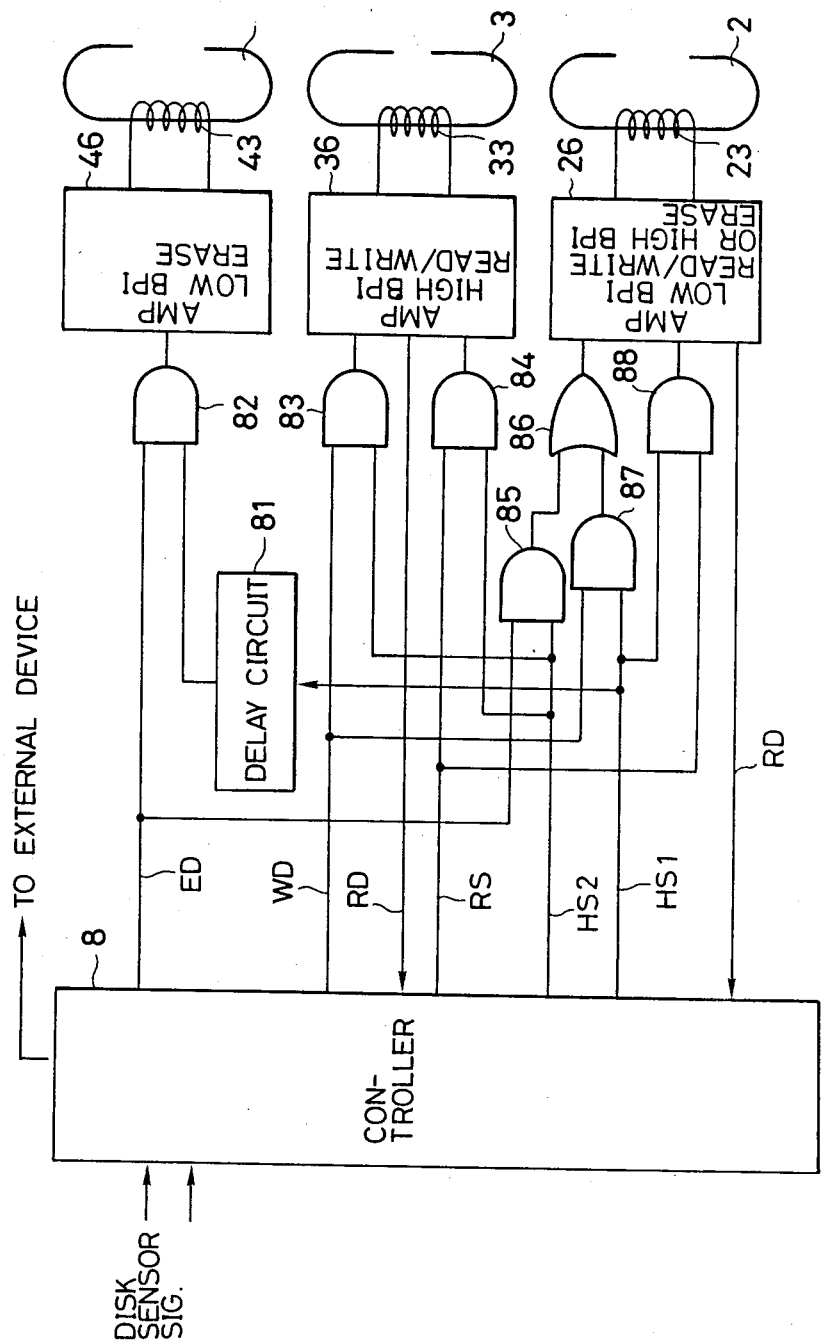
FIG. 3 is a block diagram showing a head selector incorporated in the first embodiment of the present invention.
Figure 4A:
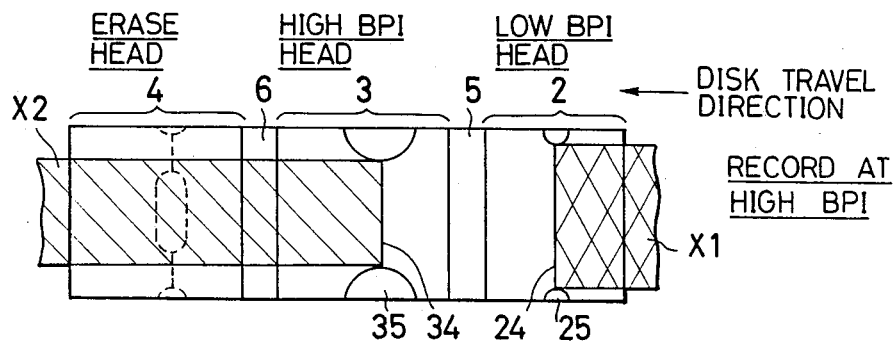
FIGS. 4 (a) to 4 (d) are top views showing the transducer sliding contact surface for assistance in explaining the recording and reproducing operation sequence of the magnetic heads of the first embodiment.
Figure 4B:
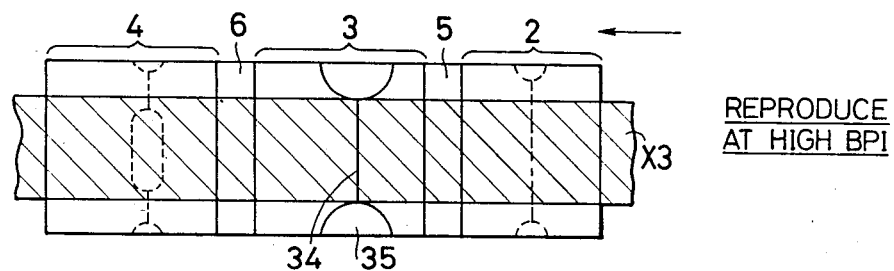
Figure 4C:
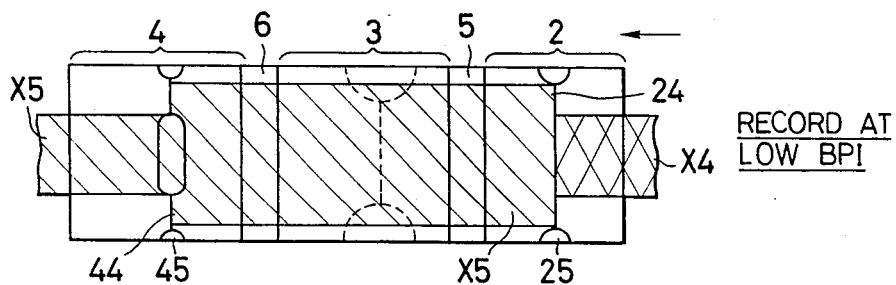
Figure 4D:
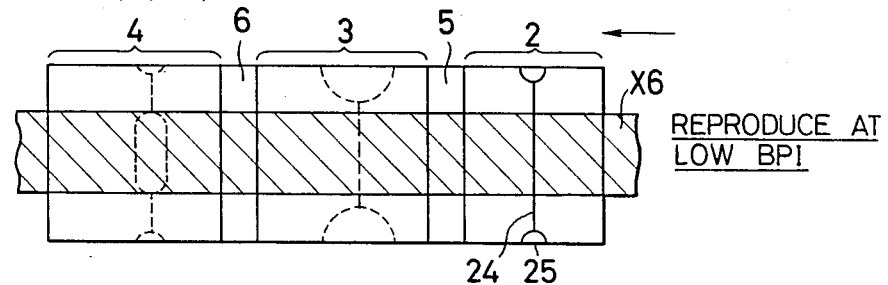

FIG. 3 shows a block diagram of a head selector including a controller 8, a delay circuit 81, various logic gates 82–88, and three amplifiers 26, 36 and 46. The controller 8 controls the operations of all the magnetic heads in response to signals indicative of the presence of a horizontal or perpendicular recording disk. The disc presence signal is detected by a disk sensor (not shown) by detecting a notch formed in either of the two disks or by activating a switch manually, before being applied to the controller 8. The delay circuit 81 receives a head signal HS1 for energizing the magnetic head 2 and the erasing head 4 from the controller 8 and outputs this signal HS to an AND gate 82 with a predetermined time delay.

The AND gate 82 receives the signal HS1 supplied from the delay circuit 81 and erasing information data ED supplied from the controller 8, and applies the erasing signal ED to an erasing head amplifier 46 when the signal HS1 is present. In response to the signal ED supplied from the AND gate 82, the amplifier 46 passes an erasing current through a coil 43 of the erasing head 4 to erase the information recorded on a disk (not shown) when a low BPI disk has been recorded, as described later.

An AND gate 83 receives write data WD to be written in the disk and a head signal HS2 for energizing magnetic head 2 or 3 from the controller 8. In response to the signal HS2, the write data WD is outputted to a magnetic head amplifier 36 via the AND gate 83.

An AND gate 84 receives a read (reproducing) signal IS for reproducing information through the magnetic head 2 or 3 and the head signal HS2 from the controller 8, and outputs the read signal RS to the amplifier 36 whenever the head signal HS2 is supplied. When the write data WD is supplied from the AND gate 83, the amplifier 36 passes a current through a coil 33 of the magnetic head 3 according to the write data WD to record the write data WD in a disk. Whenever the read signal RS is supplied from the AND gate 84, on the other hand, the amplifier 36 reproduces information recorded in a disk through the magnetic head 3. The reproduced data RD is outputted to the controller 8.

An AND gate 85 receives the erasing data ED and the head signal HS2 from the controller 8, and outputs the erasing data ED to an OR gate 86 whenever the head signal HS2 is supplied. An AND gate 87 receives the write signal WD and the head signal HS1 from the controller 8, and outputs the write data WD to the OR gate 86 whenever the head signal HS1 is supplied. The OR gate 86 receives the erasing data ED from the AND gate 85 or the write data WD from the AND gate 87 to output the received information to the amplifier 26 for the magnetic head 2.

An AND gate 88 receives the head signal HS1 and the read signal RS from the controller 8, and outputs the read signal RS whenever the head signal HS1 is supplied. When the amplifier 26 receives the write data WD through the OR gate 86, the amplifier 26 passes an erasing current according to the erase data ED through the coil 43 of the magnetic head 4 to erase information from the disk. Further, when receiving the write data WD from the OR gate 86, the amplifier 26 passes a current corresponding to this write data WD through the coil 23 of the magnetic head 2 to record the write data WD in the disk. Further, when receiving the read signal IS from the AND gate 88, the amplifier 26 outputs the information reproduced by a disk through the magnetic head 2 to the controller 8.

The operation of the floppy disk device of the present embodiment now will be described with reference to FIGS. 3 and 4.

FIGS. 4 (a) to 4 (d) show the head energization sequence when information is recorded or reproduced in or from the disk by means of the transducer 1, in which the gaps of the energized recording, reproducing and erasing heads are shown by solid lines and the gaps of the heads not in use are shown by dashed lines.

FIG. 4 (a) shows the operating conditions of each magnetic head of the transducer 1 where information is recorded, in a disk at a high recording density in accordance with the perpendicular magnetic recording method. In the case where information is recorded at a high recording density (high BPI), the controller 8 outputs a head signal HS2, erase data ED and write data WD. When the head signal HS2 is outputted, the erase data ED is supplied to the amplifier 26 via the AND gate 85 and the OR gate 86. Further, the write data WD is supplied to the amplifier 36 via the AND gate 83. When the erase data ED is supplied to the amplifier 26, the amplifier 26 outputs an erasing current corresponding to the erase data ED to the coil 23, so that information recorded in the disk is erased by the magnetic head 2. On the other hand, when the write data WD is supplied to the amplifier 36, the amplifier 36 outputs a current corresponding to the write data WD to the coil 33, so that information is recorded in the disk by the magnetic head 3. According to the above-mentioned operation, the old information $X_1$ recorded in a disk is erased by the magnetic head 2 and new information $X_2$ is recorded at the erased position by the magnetic disk 3.

FIG. 4 (b) shows the operating condition of the transducer 1 obtained when information is reproduced from the disk on which information is recorded at a high BPI in the perpendicular magnetic recording method. To reproduce information recorded at a high BPI, the controller 8 shown in FIG. 3 outputs the read signal HS2 and the read signal IS. When the head signal HS2 is outputted, the read signal IS is supplied to the amplifier 36 via the AND gate 84. When the amplifier 36 receives the read signal RS, the information reproduced through the magnetic head 3 from the disk is supplied to the controller 8. In accordance with the above operation, the information $X_3$ recorded in the disk is reproduced through the magnetic head 3.

FIG. 4 (c) shows the operating condition of the transducer 1 obtained when information is recorded in the disk in accordance with the horizontal magnetic recording method. When information is recorded in accordance with the horizontal magnetic recording method, the controller 8 shown in FIG. 3 outputs the head signal HS1, the erase data ED and the write data WD. When the head signal HS1 is outputted, the write data WD is supplied to the amplifier 26 via the AND gate 87 and the OR gate 86. When the write data WD is supplied to the amplifier 26, the amplifier 26 outputs a current corresponding to the write data WD to the coil 23, so that information is overwritten in the disk by the magnetic head 2. Further, the head signal HS1 is supplied to the AND gate 82 via the delay circuit 81, and the erase data ED is supplied to the amplifier 46 via the AND gate 82. When the erase data ED is supplied to the amplifier 46, the amplifier 46 outputs an erasing current according to the erase data ED to the coil 43, so that the information recorded in the disk by the magnetic head 2 is erased by the erasing head 4 at both the end portions of the recorded information for providing a space which allows the positional dispersion between the transducer and the disk track. In accordance with the above-mentioned operation, in the case of the horizontal magnetic recording method, new information $X_5$ is overwritten superimposed upon the old information $X_4$ recorded in the disk by the magnetic head 2, and then the recorded information is erased by the erasing head 4 at both the ends thereof.

FIG. 4 (d) shows the operating conditions of the transducer 1 obtained when information is reproduced from the disk in which information is recorded in the horizontal magnetic recording method. When information recorded in the disk is reproduced in accordance with the horizontal magnetic recording method, the controller 8 shown in FIG. 3 outputs the head signal HS1 and the read signal RS. When the head signal HS1 is outputted, the read signal RS is supplied to the amplifier 26 via the AND gate 88. When the read signal RS is received by the amplifier 26, the disk information $X_6$ reproduced by the magnetic head 2 is supplied disk information to the controller 8 as the read data RD. In accordance with the above-mentioned operation, the information recorded on the disk can be reproduced by the magnetic head 2.

According to the above-mentioned operation in the apparatus of the embodiment according to the present invention, it is possible to record or reproduce information on the basis of appropriate electromagnetic transduction characteristics of the magnetic head in or from both the disks in which information is recorded in accordance with the horizontal magnetic recording method (at low BPI) or the perpendicular magnetic recording method (at high BPI).

Figure 5:
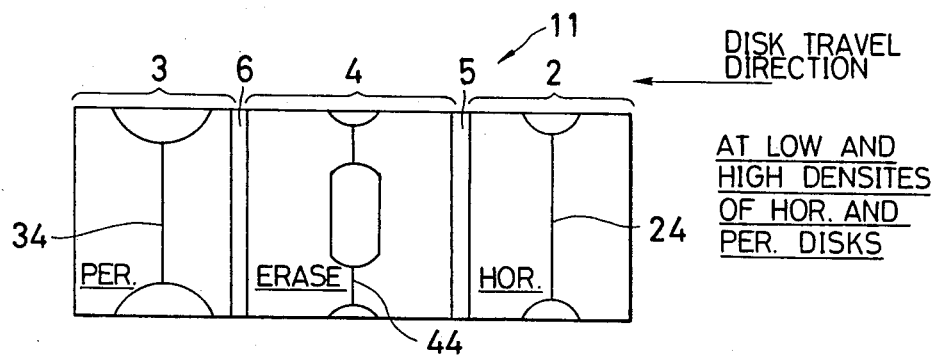
FIG. 5 is a top view showing the transducer surface for assistance in explaining a second embodiment of the present invention.

FIG. 5 shows the disk sliding contact surface of a transducer 11 of the apparatus of a second embodiment of the present invention. The transducer 11 shown in FIG. 5 is composed of the magnetic head 2, the erasing head 4 and the magnetic head 3 arranged along the disk travel direction. In this transducer 11, when information is recorded in the disk in accordance with the perpendicular magnetic recording method, old information recorded in the disk is erased by the magnetic head 2 and new information is recorded by the magnetic head 3 at the position at which the old information is erased.

Further, when information is recorded in the disk in accordance with the horizontal magnetic recording method, new information is recorded by the magnetic head 2 and the recorded information is erased by the erasing head 4 at both the ends thereof.

Figure 6:
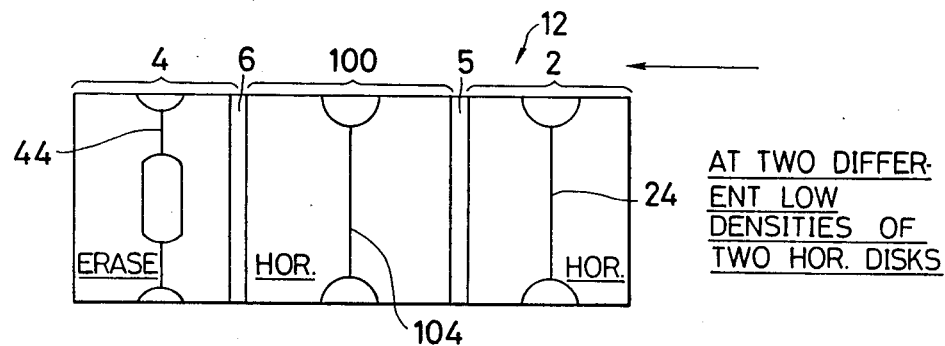
FIG. 6 is a top view showing the transducer surface for assistance in explaining a third embodiment of the present invention, by which two horizontal recording mediums having two different recording densities, respectively, are available.

FIG. 6 shows the disk sliding contact surface of a transducer 12 of the apparatus of a third embodiment of the present invention, in which two horizontal recording disks with different low recording densities, respectively, are applicable. The transducer 12 shown in FIG. 6 is composed of the magnetic head 2, the erase head 4, and a magnetic head 100 intervening between the two. The gap length of the R/W gap 104 of this magnetic head 100 is different from the gap length 24 of the magnetic head 2. For instance, if the gap length 24 is longer than gap length 104 of the head 100, the recording and reproducing operations at a low BPI are effected by the magnetic head 24, while those at a high BPI are effected by the magnetic head 100. The information recorded by the magnetic head 2 or the magnetic head 100 is erased by the erasing head 4 at both the end portions thereof.

Figure 7:
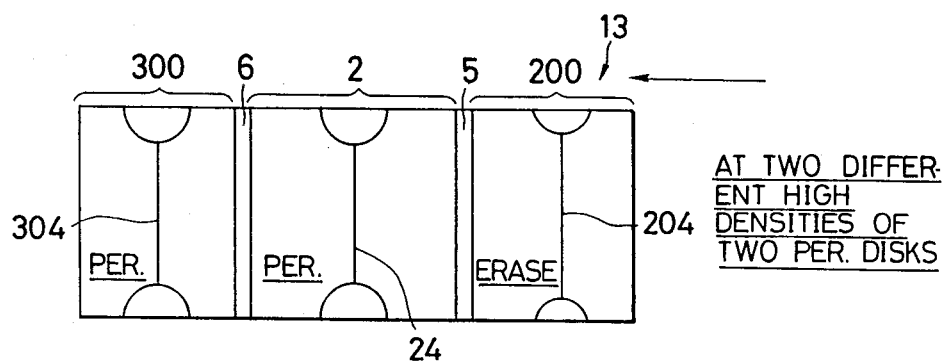
FIG. 7 is a similar top view showing the transducer surface for assistance in explaining a fourth embodiment of the present invention, by which two perpendicular recording mediums having two different recording densities, respectively, are available.

FIG. 7 shows the disk sliding contact surface of the transducer 13 of the apparatus of a fourth embodiment, in which two perpendicular recording disks with different high recording densities, respectively, are applicable. The transducer 13 is composed of an erasing head 200, a magnetic head 2, and a magnetic head 300 arranged along the disk travel direction. The gap length 24 of the magnetic head 2 is different from gap length 304 the magnetic head 300. For instance, if the gap length 304 is longer than gap length 24 of the head 2, the recording and reproducing operations at a low BPI are effected by the magnetic head 300, while those at a high BPI are effected by the magnetic head 24. The information recorded in the disk is erased by the erasing head 200 with a gap 204 longer than gaps 24 and 304 of the other heads 2 and 300, before information is recorded by any one of the heads 2 and 300. Further, the new information is recorded by the magnetic head 2 or 300 at the position at which old information is erased.

In the above embodiments, the magnetic heads are of the closed magnetic path type. However, without being limited to the closed magnetic path type, the present invention can be realized by the use of a transducer in which two or more single magnetic pole heads for different recording densities (BPI) are arranged along the disk travel direction.

Further, the magnetic head 3 shown in FIGS. 1 and 3, the magnetic head 100 shown in FIG. 6, and the magnetic head 300 shown in FIG. 7 can be each modified into a single magnetic pole head so as to form the transducer according to the present invention.

Further, two magnetic heads are provided for recording and reproducing information in each of the embodiments. However, without being limited to two heads, it is possible to provide two or more magnetic heads.

Furthermore, without being limited to the field of floppy disk devices, the present invention is applicable to all the fields of magnetic recording and reproducing devices such as a a magnetic disk device, magnetic tape device, etc.

According to the present invention, since the transducer comprises a plurality of magnetic heads for recording and reproducing information at different recording densities, the head arranged along the travel direction of a magnetic recording medium so that the magnetic head can be used appropriately according to the information recording density, it is possible to record or reproduce information on the basis of different electromagnetic transduction characteristics suitable to each recording density of each magnetic recording medium whenever plural magnetic recording mediums of different recording densities are loaded. In addition, since the plural magnetic heads are arranged along the travel direction of the magnetic recording medium, the track locating control for the transducer can be facilitated. Further, since the erasing magnetic head can be used in common together with the recording and reproducing heads, the transducer arrangement is simple as compared when the magnetic heads are arranged perpendicular to the travel direction of the magnetic recording medium.

What is claimed is:

1. A magnetic head apparatus compatible with both horizontal and perpendicular recording media, comprising:
   (a) first magnetic head means for recording and reproducing information in or from said horizontal recording medium at a first predetermined recording density;
   (b) second magnetic head means, arranged backward from said first magnetic head means in a magnetic recording medium travel direction, for recording and reproducing information in or from said perpendicular recording medium at a second predetermined recording density higher than that of said horizontal recording medium; and
   (c) head selecting means for selecting any one of the first and second magnetic head means in response to a signal indicative of the presence of any one of the horizontal and perpendicular recording mediums.

2. The magnetic head apparatus as set forth in claim 1, further comprising third magnetic erasing head means, arranged backward from said second magnetic head means in the magnetic recording medium travel direction, for erasing both end portions, of information overwritten horizontal recording medium by any one of said first and second magnetic head means with a different recording density, respectively.

3. The magnetic head apparatus as set forth in claim 1, further comprising third magnetic erasing head means, arranged frontward of said first magnetic head means in the magnetic recording medium travel,.direction, for erasing old information recorded in the perpendicular recording medium before new information is recorded by any one of said first and second magnetic head means with a different recording density, respectively.

4. A magnetic head apparatus, compatible with both horizontal and perpendicular recording media, for recording information in and reproducing information from the recording media, comprising:
   (a) first magnetic head means for recording and reproducing information in or from the horizontal recording medium at a first predetermined recording density;
   (b) second magnetic head means, arranged backward from said first magnetic head means in a magnetic recording medium travel direction, for recording and reproducing information in or from the perpendicular recording medium at a second predetermined recording density higher than that of said horizontal recording medium; and (c) head selecting means for selecting any one of the first and second magnetic hear means in response to a signal indicative of the presence of any one of the horizontal and perpendicular recording mediums, wherein said third magnetic head means is arranged backward from said second magnetic head means in the magnetic recording medium travel direction and erases both end portions of information overwritten in the horizontal recording medium by said first magnetic head means, both the end portions of information recorded by said first magnetic head means are erased by said third magnetic erasing head means, and when the recording density of said first magnetic head means is lower than that of said second magnetic head means and information is recorded in the perpendicular recording medium by said second magnetic head means, information is first erased by said first magnetic head means and then recorded by said second magnetic head means.

5. The magnetic head apparatus as set forth in claim 4, wherein said third magnetic erasing head means is arranged backward from said first magnetic head means in the magnetic recording medium travel direction.

6. The magnetic head apparatus as set forth in claim 4, wherein a track width of information recorded by said first magnetic head means is wider than that recorded by said second magnetic head means.

* * * * *